United States Patent [19]
Wright

[11] Patent Number: 5,956,964
[45] Date of Patent: Sep. 28, 1999

[54] COOLER TRANSITION MEANS

[75] Inventor: Peter Sydney Wright, Blackwood, Australia

[73] Assignee: F F Seeley Nominees Pty Ltd, St Marys, Australia

[21] Appl. No.: 09/079,849

[22] Filed: May 15, 1998

[30] Foreign Application Priority Data

May 16, 1997 [AU] Australia .............................. PO 6883

[51] Int. Cl.⁶ .................................................... F28D 5/00
[52] U.S. Cl. .......................... 62/304; 62/310; 261/103; 261/106; 261/36.1
[58] Field of Search ................... 62/304, 310; 261/36.1, 261/DIG. 3, DIG. 43, 103, 106, DIG. 41, DIG. 46

[56] References Cited

U.S. PATENT DOCUMENTS

| 4,026,971 | 5/1977 | Glasoe | 261/29 |
|---|---|---|---|
| 4,094,935 | 6/1978 | Walker et al. | 261/80 |
| 4,386,038 | 5/1983 | Walker | 261/80 |
| 4,612,778 | 9/1986 | Medrano | 62/311 |
| 5,606,868 | 3/1997 | Calvert | 62/315 |

*Primary Examiner*—Henry Bennett
*Assistant Examiner*—Mark Shulman
*Attorney, Agent, or Firm*—Watts, Hoffmann, Fisher & Heinke Co., L.P.A.

[57] ABSTRACT

The invention provides a conversion means for converting a fixed type evaporative cooler (10) to a mobile type that includes a base with an opening (15), a sump (14) which can be of a size to suit one or more large coolers, means to accommodate a pump in the sump, wheels (24) firmly attached to the sump for support and mobility thereof, a filling station (22) for depositing water into the sump, and means to secure the sump to the base of a large cooler (12). The means to accommodate the pump includes a buoyant platform (16) thereby enabling the pump to remain in communication with fluid in the sump irrespective of the fluid level.

16 Claims, 1 Drawing Sheet

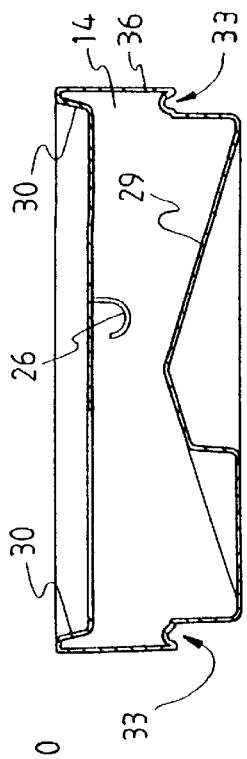
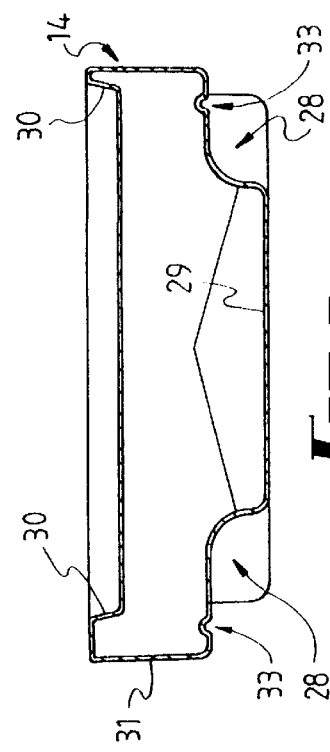
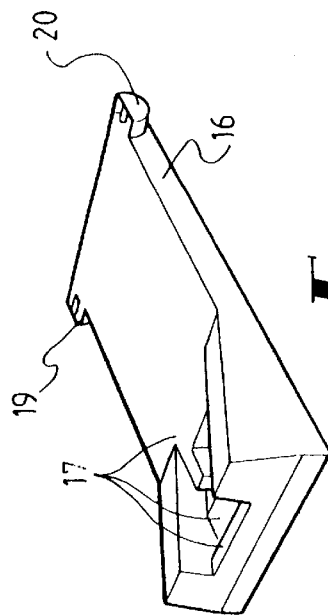
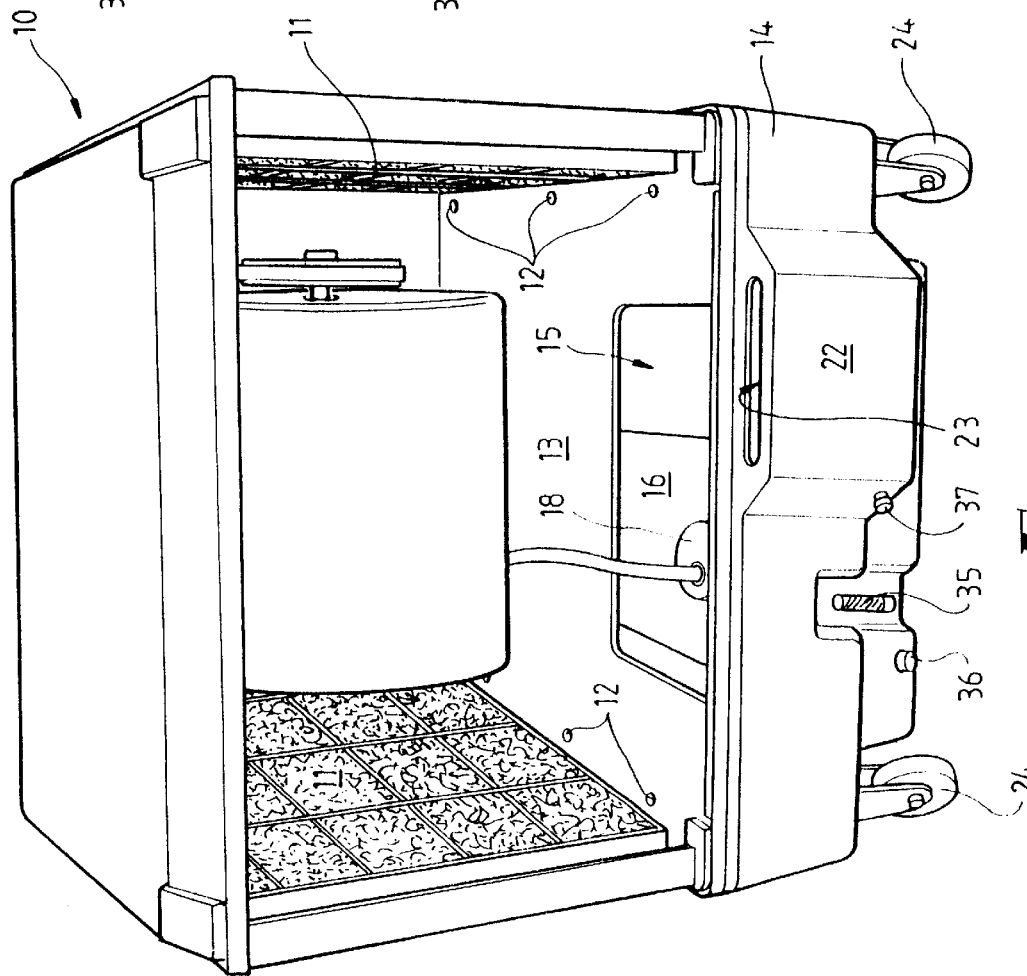

COOLER TRANSITION MEANS

FIELD OF THE INVENTION

This invention relates to transition means for an evaporative cooler, which is capable of converting a large cooler intended for fixed roof top installation to a portable or mobile cooler.

DESCRIPTION OF THE PRIOR ART

There are generally two types of evaporative coolers in use, portable coolers which can be moved around within a room of a house, for example, or generally larger roof top coolers which are associated with duct work for delivering large quantities of cooled air to various outlets in a building. There is a relatively large difference in size and cost. The choice of which type of cooler to use for a specific application is usually dictated by the size of the area to be cooled. For installations comprising a number of areas to be cooled, a fixed system comprising ducts to carry the cool air to the various areas is generally warranted. For situations wherein only a local or relatively small area is to be cooled, a smaller portable cooler will usually suffice. The vast majority of installations of evaporative coolers occur in domestic or private residences. Accordingly, most product design and development has been oriented to satisfying the needs of these types of installations.

There are industrial installations of evaporative coolers, however, these are generally fixed installations as portable coolers are generally considered to be of inadequate capacity in providing for the cooling needs of these environments. However, there are applications, such as specific areas within an industrial area or sporting fixtures, wherein large coolers are required because of their output being much greater than the small portable coolers, but they are not required to be a permanent installation because of various reasons, for example the temporary nature of a grand stand or viewing location which is dismantled at the completion of the event. That is but one of a number of situations where it is desirable to have a large cooler which is mobile. A significant problem with the provision of a mobile cooler with a large cooling capacity is the supply of a sufficiently large amount of water as mobile coolers are generally not provided with a continuous supply of water.

BRIEF SUMMARY OF THE INVENTION

It is an object of this invention to provide a means to convert an evaporative cooler of the fixed type to a mobile or portable type.

The use of as many of the original equipment components of the fixed cooler, such as a pump, considerably reduces the cost of the conversion because it then only requires the provision of a sump, thereby enabling the cooler to have an adequate supply of water, with its wheels and other minor components. In the case of the pump, it is preferable to make use of an existing non-submersible pump that is normally supplied with a fixed cooler. This type of pump is generally fixed in position in a fixed cooler such that the lower 50 mm to 100 mm (approximately 2 inches to 4 inches) is below the water level. This enables the pump to draw in water for pumping to the pads of the cooler. As fixed coolers are generally connected to a continuous water supply, a float valve is generally employed to retain the water level to a prescribed level. Hence, the pump may be located in a fixed position as the water level does not vary in a fixed cooler to a large extent.

Portable coolers are generally not connected to a continuous water supply and as a result, the water level varies to a much larger extent as compared with a fixed cooler. Accordingly, it is not possible to firmly locate the pump within the sump the pump will not be able to pump any water once the water level has dropped below the pump body. It will be recognised by those skilled in the art that this particular type of pump, which is generally confined to use in fixed coolers, is not capable of drawing a head of pressure. Therefore, the base of this type of pump must remain below the water level in order for it to operate effectively. It is possible to use a submersible type of pump as a replacement for the non-submersible pump. However, submersible pumps generally suffer from a higher failure rate than non-submersible pumps and are generally of greater cost. Accordingly, the applicant sought a means by which the non-submersible pump of a fixed cooler could be used in a portable type of cooler as part of the conversion of a fixed cooler to a portable cooler.

The invention provides a conversion means that includes a base with an opening, a sump which can be of a size to suit one or more large coolers, means to accommodate a pump in the sump, wheels firmly attached to the sump for support and mobility thereof, a filling station for depositing water into the sump, and means to secure the sump to the base of a large cooler.

It is preferable for the sump to be of similar width and length dimensions to the base of a larger cooler thereby enabling the sump to contain the maximum amount of water for a particular depth. It is also preferable for the sump to include a raised section in the base of the sump to provide structural support for the base of the sump.

It is preferable that the means to accommodate the pump include a buoyant platform and a mount for the pump. In this regard, it is also preferable that the means to accommodate the pump include a buoyant platform with a hinge means at one end of the buoyant platform with a mounting means at the other end of the platform to mount the pump so that the pump raises and lowers according to the level of water in the sump.

It is yet further preferable that the sump include a filling station to enable the depositing of water into the sump and that the filling station include a baffle or apron to inhibit spillage or splashing of water during the filling operation. In this regard, it is also preferable that the upper end of the wall of the sump include a, lip that forms a surface to which the base of the fixed unit may be firmly attached and more importantly, inhibits the spillage of water from the sump when it is moved whilst the sump contains a relatively large amount of water.

It is also preferable that the sump include a water level indicator. The water level indicator preferably includes a clear tube aligned generally vertically with sloping graduation lines such that when the sloping lines are viewed through water, the refractive index of the water causes the sloping lines to appear horizontal to a person viewing the level indicator. It is also preferable that the sump include recesses in the walls of the sump to enable a user to "hand hold" the sump section.

It is also preferable for the opening in the base to be of sufficient dimensions to enable the pump to be accommodated and also for the sump to be inspected and cleaned.

It is also preferable that wheels provided to support the sump depend from each of the four corners of the sump, two of the wheels being castor wheels at on end and the other two being rotatable about an axis fixed with respect to the sump at the other end. Additionally, it is preferred that the wheels include an apron or cover to prevent spillage of water onto the wheels. It is also preferable for the wheels and the supporting mount for the wheels to be of sufficient dimension to enable the insertion of a lifting device beneath the sump such as a fork lift thereby enabling ease of transport of the cooler.

The means to secure the sump to the base of a large cooler can, for example, merely comprise a plurality of bolts or rivets which extend through the base.

By means of this invention, a fixed type cooler can be converted to a mobile type cooler relatively simply and inexpensively. The components of the conversion can be provided in a kit form for sale to purchasers of fixed type coolers thereby enabling them to retrofit the conversion to a fixed cooler. The conversion of a fixed type cooler is a relatively straight forward operation and can be performed by an operator of similar skill to those who install fixed coolers. The maximum re-use of components within a fixed cooler to be converted enables the supply of conversion kits in this form at the least cost and with the least wastage of component.

BRIEF DESCRIPTION OF THE DRAWINGS

Other features of the invention are described hereunder with reference to and are illustrated in the accompanying sketches in which:

FIG. 1 is a perspective view of the interior of an original equipment large cooler mounted on a sump;

FIG. 2 is a central section through the sump before assembly taken in a fore and aft direction;

FIG. 3 is a section of the sump moulding before assembly taken in a direction at right angles to FIG. 2, and showing the recesses for the wheels; and FIG. 4 is a perspective view which illustrates the buoyant platform for the pump.

DESCRIPTION OF THE PREFERRED EMBODIMENT

Roof top or fixed coolers are sometimes produced with the same 'foot print' but with different heights, thereby enabling coolers of varying cooling capacity to be produced with the same base unit, and in this invention advantage is taken of that situation.

Referring to FIG. 1, an original equipment cooler 10 is provided with four sides at least three of which comprise porous pads 11, and one comprises an outlet grille (not shown). One of said three sides is removed in FIG. 1 to enable the interior of the cooler to be illustrated.

A series of rivets 12 extend through the base 13 of a fixed type cooler 10, and secure the base 13 to the sump 14 which is added to the original equipment to provide mobility and larger water capacity. In the preferred embodiment, the sump is capable of retaining approximately 100 litres (approximately 3.5 cubic feet) of water. The base 13 has removed therefrom a portion to provide an opening 15 of sufficient size to receive a buoyant platform 16 which has a shape as illustrated in FIG. 4, and also provides access for inspection and cleaning of the sump. The buoyant platform 16 provided with mounting surfaces 17 which are of a shape and size suitable for the mounting of a pump 18 near one end. The other end of the buoyant platform 16 is provided with curved projections 19 and 20 and these engage surfaces (an example of one of which is designated 26 in FIG. 2) to retain the buoyant platform 16 in position with respect to the sump 14 whilst allowing pivoting movement.

Sump 14 is made with sufficient volumetric capacity to contain a relatively large quantity of water, since the arrangement may be required to be used where mains water is not readily available. Large equipment such as the fixed cooler 10 evaporates large quantities of water on a hot day. Accordingly, the sump 14 is provided with a forwardly projecting wall portion 22 which has a filing aperture 23, and not shown are baffles or aprons within the space defined by the wall portion 22 which inhibit splashing. Further means are provided adjacent the opening 15, but these are optional because most water which spills onto the base 13 is likely to run back into the sump 14. A lip 30 is provided at the upper end of the walls of the sump 14 and continues around the periphery of the sump 14. The lip 30 inhibits spillage of water from the sump 14 when the mobile cooler is moved. As will be appreciated by those skilled in the art, the dimensions of the lip 30 may be varied in accordance with the size of the sump 14 and the amount of water expected to be contained within the sump 14 to prevent spillage from the sump 14 when the mobile cooler is moved from one position to another. In the preferred embodiment, the lip is extended by a planar section to effectively create a cover over the top of the sump 14 with the only aperture being that which is of similar size and alignment to the opening in the base of the fixed cooler.

The wheels supporting the sump are designated 24.

FIG. 2 illustrates the cross-sectional shape of the sump 14, that section being taken in a fore and aft direction and FIG. 3 in a transverse direction, FIG. 3 showing the recesses 28 for the wheels 24 and FIG. 2 showing the pyramid shape of the floor 29 of the sump 14 which stiffens the floor of the sump against "oil canning". This shape is also useful for retaining the position of the buoyant platform 16. FIG. 2 also shows a hand hold recess 33 on each of the walls 31 which can function as a hand hold recess for handling the sump 14. The wheels 24 lift the sump 14 from the ground sufficiently for the assembly to be lifted by fork lift trucks.

Further details are illustrated in FIG. 1 which shows sight glass 35 by which the water level can be ascertained, drain plug 36 and alternative filling inlet 37.

The filling inlet 37 includes a reconfigured float valve of a fixed cooler and allows the portable cooler to be connected to a continuous water supply if one is readily available.

Water level indicator 35 utilises a high visibility refraction pattern, wherein sloping lines at the rear of the glass appear to be horizontal when viewed through water.

Drain plug 36 enables the removal of water from the sump 14 when the mobile cooler is being stored or requires cleaning of the sump 14.

The invention will be seen to be very simple, but has a commercial value in providing high capacity coolers in situations where permanent installation is inappropriate. In addition, the conversion means enables the re-use of the main components of a fixed cooler including the pump and float valve thereby reducing the cost of such a conversion.

Conversion of a fixed cooler to a mobile type simply requires the removal of a portion of the base of the fixed unit, the attachment of the sump and the repositioning and reconfiguration of various parts that are already included in the fixed cooler including the pump and the float valve. Lengthening of various hoses, wiring of the controller and power supply and various other ancillary tasks are required, however, these are normally required of operators who install fixed evaporative coolers.

Use of the existing nonsubmersible pump is the preferred approach to keep the cost of the conversion to a minimum.

Even though the pump may be of the submersible type, it is still desirable to retain as much of the pump above water level as possible thereby reducing the higher failure rate experienced by submerged pumps, and by utilising a floating platform, that facility can be provided for relatively low cost.

As can be seen from the above, this invention provides a conversion means for converting a large fixed type cooler to a mobile or portable type cooler thereby enabling the provision of a relatively large cooling capacity in a mobile unit. In addition, that means is provided such that the use of the original equipment supplied as part of a fixed cooler is used in the mobile unit thereby keeping the cost of the conversion to a minimum whilst retaining the use of non-submersible pump which generally has a lower failure rate as compared with submersible pumps.

It will be noted by those skilled in the art that the conversion is applicable to various types of fixed coolers and in the instance of coolers that are provided with the same base unit and different height pads, mobile units of varying capacity can be produced by means of this conversion to provide mobile coolers of varying capacity.

Additionally, it will also be noted by those skilled in the art that although the preferred embodiment details a fixed cooler with a side discharge which has been converted to a mobile cooler, a fixed cooler with a top discharge can similarly be converted.

What I claim is:

1. A conversion means for converting an evaporative cooler of a fixed type to a mobile type including a base with an opening, a sump, a means to accommodate a pump in the sump, wheels firmly attached to the sump, a filling station for depositing water into the sump, and means to secure the sump to the base, said means to accommodate a pump including a buoyant platform and a mounting means on said buoyant platform for mounting the pump thereby enabling the pump to remain in communication with fluid in the sump independent of the fluid level in the sump.

2. A conversion means according to claim 1 wherein said buoyant platform also includes a hinge means at one end of the buoyant platform and said mounting means at the other end of said platform.

3. A conversion means according to claim 2 wherein said sump includes a pivotal mount for said buoyant platform hinge means.

4. A conversion means for converting an evaporative cooler of a fixed type to a mobile type including a base with an opening, a sump, a means to accommodate a pump in the sump, wheels firmly attached to the sump, a filling station for depositing water into the sump, and means to secure the sums to the base said sump also including a lip at the upper end of a wall of the sump thereby inhibiting the spillage of water from the sump during movement of the converted mobile cooler.

5. A conversion means according to claim 4 wherein said lip extends beyond the wall of the sump generally horizontally inwardly thereby providing an attachment area to which a base may be firmly attached, said lip extension defining an opening in the top of the sump.

6. A conversion means according to claim 5 wherein said opening in the base is of similar dimensions to the opening in the top of the sump.

7. A conversion means according to claim 1 wherein said opening is of sufficient dimensions to enable said pump to be accommodated.

8. A conversion means according to claim 1 wherein said sump includes a raised section in the base of the sump thereby providing structural support for the sump.

9. A conversion means for converting an evaporative cooler of a fixed type to a mobile type including a base with an opening, a sump, a means to accommodate a pump in the sump, wheels firmly attached to the sump, a filling station for depositing water into the sump, and means to secure the sums to the base, and, said filing station including an aperture in the upper end of a wall of the sump, and said filling station also including a baffle to inhibit spillage or splashing of water.

10. A conversion means for converting an evaporative cooler of a fixed type to a mobile type including a base with an opening, a sump, a means to accommodate a pump in the sump, wheels firmly attached to the sump, a filling station for depositing water into the sump, means to secure the sump to the base, said sump being generally rectangular in shape and said wheels depending from each corner of said sump, said wheels being of sufficient dimensions to enable the insertion of a lifting device beneath the sump.

11. A conversion means according to claim 1 wherein said sump includes a water level indicator.

12. A conversion means for converting an evaporative cooler of a fixed type to a mobile type including a base with an opening, a sump, a means to accommodate a pump in the sump, wheels firmly attached to the sump, a filling station for depositing water into the sump, means to secure the sump to the base, and said sump including a water level indicator, said water level indicator including a hollow transparent tube aligned generally vertically, the lower end of the tube being in fluid communication with the interior of the sump, an said water level indicator also including sloping indicator lines at the rear of the tube, said lines being of a slope such that when viewed through water the lines appear generally horizontal.

13. A conversion means according to claim 1 wherein said sump includes a valved inlet into the interior of the sump for the connection of a continuous supply of water for filling the sump.

14. A conversion means according to claim 13 wherein said valved inlet includes a float valve.

15. A conversion means according to claim 1 wherein said sump also includes a drainage plug in fluid communication with the interior of the sump thereby enabling the sump to be drained.

16. A conversion means for converting an evaporative cooler of a fixed type to a mobile type including a base with an opening, a sump, a means to accommodate a pump in the sump, wheels firmly attached to the sump, a filling station for depositing water into the sump, means to secure the sump to the base, said sump including recesses in the walls of the sump providing grasping points for the hands of a user.

* * * * *